United States Patent
Bond et al.

(10) Patent No.: US 12,179,784 B2
(45) Date of Patent: Dec. 31, 2024

(54) DETECTION OF HEALTH CONDITIONS IN VEHICLE OCCUPANTS

(71) Applicant: GM Global Technology Operations LLC, Detroit, MI (US)

(72) Inventors: Jacob Alan Bond, Rochester Hills, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 13 days.

(21) Appl. No.: 18/164,956

(22) Filed: Feb. 6, 2023

(65) Prior Publication Data

US 2024/0262375 A1   Aug. 8, 2024

(51) Int. Cl.
| | |
|---|---|
| *B60W 50/14* | (2020.01) |
| *B60W 40/08* | (2012.01) |
| *B60W 40/10* | (2012.01) |
| *G06N 20/00* | (2019.01) |
| *G06V 20/59* | (2022.01) |
| *G06V 40/10* | (2022.01) |
| *G06V 40/20* | (2022.01) |

(52) U.S. Cl.
CPC ............ *B60W 50/14* (2013.01); *B60W 40/08* (2013.01); *B60W 40/10* (2013.01); *G06N 20/00* (2019.01); *G06V 20/593* (2022.01); *G06V 40/10* (2022.01); *G06V 40/20* (2022.01); *B60W 2420/403* (2013.01); *B60W 2510/202* (2013.01); *B60W 2540/10* (2013.01); *B60W 2540/12* (2013.01); *B60W 2540/18* (2013.01); *B60W 2540/221* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 11,065,958 B2* | 7/2021 | Mestha | G06V 10/147 |
| 2018/0029612 A1* | 2/2018 | Tsuyunashi | B60W 40/04 |
| 2019/0061772 A1* | 2/2019 | Prinz | B60K 28/06 |
| 2019/0299999 A1* | 10/2019 | Liu | G06V 20/597 |
| 2019/0340448 A1* | 11/2019 | Hayashi | G06N 3/08 |
| 2019/0382025 A1* | 12/2019 | Mena Benito | A61B 5/18 |

(Continued)

FOREIGN PATENT DOCUMENTS

RU   2682996 C1 *   3/2019

OTHER PUBLICATIONS

White, et al. "Detecting neurodegenerative disorders from web search signals," NPJ Digital Medicine, Apr. 2018.

*Primary Examiner* — Muhammad Adnan
(74) *Attorney, Agent, or Firm* — Vivacqua Crane, PLLC

(57) ABSTRACT

A system for detecting a health condition of an occupant of a vehicle includes a plurality of vehicle sensors and a controller in electrical communication with the plurality of vehicle sensors. The controller is programmed to perform a plurality of measurements using the plurality of vehicle sensors determine a health risk probability based at least in part on the plurality of measurements. The health risk probability is a probability that the occupant of the vehicle has the health condition. The controller is further programmed to notify the occupant of the vehicle in response to determining that the health risk probability is greater than or equal to a predetermined health risk threshold.

17 Claims, 2 Drawing Sheets

(56) References Cited

U.S. PATENT DOCUMENTS

| | | | |
|---|---|---|---|
| 2020/0290543 A1* | 9/2020 | Saito | B60W 40/08 |
| 2021/0097408 A1* | 4/2021 | Sicconi | G06N 20/00 |
| 2021/0380092 A1* | 12/2021 | Oyagi | B60W 50/0097 |
| 2022/0219733 A1* | 7/2022 | Abdulkhaleq | B60W 50/023 |
| 2023/0066459 A1* | 3/2023 | Kobayashi | B60W 30/16 |
| 2023/0112797 A1* | 4/2023 | Sicconi | G06V 10/46 |
| | | | 705/26.7 |
| 2023/0192149 A1* | 6/2023 | Uchiyama | B60W 60/0053 |
| | | | 701/23 |
| 2023/0249686 A1* | 8/2023 | Sugimoto | B60W 60/0016 |
| | | | 701/70 |
| 2024/0067201 A1* | 2/2024 | Yamada | B60W 50/14 |
| 2024/0262375 A1* | 8/2024 | Bond | G06V 40/10 |

* cited by examiner

DETECTION OF HEALTH CONDITIONS IN VEHICLE OCCUPANTS

INTRODUCTION

The present disclosure relates to vehicle sensor systems, and more particularly to systems and methods for detecting health conditions for an occupant of a vehicle.

To increase occupant comfort and convenience, vehicles may be equipped with various sensors which are configured to provide an interface between the occupant and the vehicle, allowing the occupant to control the vehicle. Vehicle sensors may include accelerator pedal position sensors, brake pedal position sensors, steering angle sensors, and the like. However, vehicle sensor systems may not identify occupant inputs which may be indicative of a health condition. Furthermore, vehicles may be equipped with human-machine interfaces such as displays having touchscreens. However, vehicle human-machine interfaces may not identify occupant inputs which may be indicative of a health condition.

Thus, while vehicle sensor systems and methods achieve their intended purpose, there is a need for a new and improved system and method for detecting health conditions for an occupant of a vehicle.

SUMMARY

According to several aspects, a system for detecting a health condition of an occupant of a vehicle is provided. The system includes a plurality of vehicle sensors and a controller in electrical communication with the plurality of vehicle sensors. The controller is programmed to perform a plurality of measurements using the plurality of vehicle sensors determine a health risk probability based at least in part on the plurality of measurements. The health risk probability is a probability that the occupant of the vehicle has the health condition. The controller is further programmed to notify the occupant of the vehicle in response to determining that the health risk probability is greater than or equal to a predetermined health risk threshold.

In another aspect of the present disclosure, the plurality of vehicle sensors includes at least one control sensor and at least one reference sensor. The at least one control sensor is configured to measure a control input provided to the vehicle by the occupant. The at least one reference sensor is configured to measure a movement of the vehicle. To perform the plurality of measurements, the controller is further programmed to perform a plurality of control measurements using the at least one control sensor. To perform the plurality of measurements, the controller is further programmed to perform a plurality of vehicle movement measurements using the at least one reference sensor. To perform the plurality of measurements, the controller is further programmed to determine a plurality of occupant control inputs based at least in part on the plurality of control measurements and the plurality of vehicle movement measurements.

In another aspect of the present disclosure, to determine the health risk probability, the controller is further programmed to determine the health risk probability using a machine learning algorithm. The machine learning algorithm is trained to determine the health risk probability based on a plurality of model input data. The plurality of model input data includes at least the plurality of occupant control inputs.

In another aspect of the present disclosure, to determine the health risk probability, the controller is further programmed to generate a plurality of expected control inputs using the automated driving system. To determine the health risk probability, the controller is further programmed to determine the health risk probability using the machine learning algorithm. The machine learning algorithm is trained to determine the health risk probability based on the plurality of model input data. The plurality of model input data further includes the plurality of expected control inputs.

In another aspect of the present disclosure, to determine the health risk probability, the controller is further programmed to establish a connection with a mobile device using the vehicle communication system. To determine the health risk probability, the controller is further programmed to retrieve a plurality of mobile device health data from the mobile device using the vehicle communication system. To determine the health risk probability, the controller is further programmed to determine the health risk probability using the machine learning algorithm. The machine learning algorithm is further trained to determine the health risk probability based on the plurality of model input data. The plurality of model input data further includes the plurality of mobile device health data.

In another aspect of the present disclosure, the controller is further programmed to establish a connection with a remote server using the vehicle communication system. The controller is further programmed to transfer the plurality of model input data to the remote server using the vehicle communication system. The machine learning algorithm is executed by the remote server using the plurality of model input data. The controller is further programmed to receive the health risk probability from the remote server using the vehicle communication system.

In another aspect of the present disclosure, the plurality of vehicle sensors includes an occupant movement sensor. To determine the health risk probability, the controller is further programmed to perform a plurality of occupant movement measurements using the occupant movement sensor. To determine the health risk probability, the controller is further programmed to determine the health risk probability using the machine learning algorithm. The machine learning algorithm is further trained to determine the health risk probability based on the plurality of model input data. The plurality of model input data further includes the plurality of occupant movement measurements.

In another aspect of the present disclosure, the occupant movement sensor is a camera. To perform the plurality of occupant movement measurements, the controller is further programmed to capture a plurality of videos of the occupant using the camera. To perform the plurality of occupant movement measurements, the controller is further programmed to determine a plurality of occupant induced movements in the plurality of videos of the occupant. To perform the plurality of occupant movement measurements, the controller is further programmed to determine the health risk probability using the machine learning algorithm. The machine learning algorithm is further trained to determine the health risk probability based on the plurality of model input data. The plurality of model input data further includes the plurality of occupant induced movements.

In another aspect of the present disclosure, to determine the health risk probability, the controller is further programmed to record a plurality of touch accuracies of a plurality of occupant interactions with the display. To determine the health risk probability, the controller is further programmed to determine the health risk probability using the machine learning algorithm. The machine learning algorithm is further trained to determine the health risk probability based on the plurality of model input data. The plurality of model input data further includes the plurality of touch accuracies of the plurality of occupant interactions with the display.

In another aspect of the present disclosure, the controller is further programmed to label the model input data as positive diagnosis model input data in response to determining that the health risk probability is greater than or equal to the predetermined health risk threshold. The controller is further programmed to train the machine learning algorithm using the positive diagnosis model input data in response to labeling the model input data as positive diagnosis model input data. The controller is further programmed to label the model input data as negative diagnosis model input data in response to determining that the health risk probability is less than the predetermined health risk threshold. The controller is further programmed to train the machine learning algorithm using the negative diagnosis model input data in response to labeling the model input data as negative diagnosis model input data.

According to several aspects, a method for detecting a health condition of an occupant of a vehicle is provided. The method includes performing a plurality of measurements using a plurality of vehicle sensors. The method also includes determining a health risk probability based at least in part on the plurality of measurements. The health risk probability is a probability that the occupant of the vehicle has the health condition. The method also includes notifying the occupant of the vehicle in response to determining that the health risk probability is greater than or equal to a predetermined health risk threshold.

In another aspect of the present disclosure, performing the plurality of measurements further may include performing a plurality of control measurements using the plurality of vehicle sensors. Performing the plurality of measurements further may include performing a plurality of vehicle movement measurements using the plurality of vehicle sensors. Performing the plurality of measurements further may include determining a plurality of occupant control inputs based at least in part on the plurality of control measurements and the plurality of vehicle movement measurements.

In another aspect of the present disclosure, determining the health risk probability further may include determining the health risk probability using a machine learning algorithm. The machine learning algorithm is trained to determine the health risk probability based on a plurality of model input data. The plurality of model input data includes at least the plurality of occupant control inputs.

In another aspect of the present disclosure, determining the health risk probability further may include generating a plurality of expected control inputs using an automated driving system. Determining the health risk probability further may include determining the health risk probability using the machine learning algorithm. The machine learning algorithm is trained to determine the health risk probability based on the plurality of model input data. The plurality of model input data further includes the plurality of expected control inputs.

In another aspect of the present disclosure, determining the health risk probability further may include establishing a connection with a mobile device using a vehicle communication system. Determining the health risk probability further may include retrieving a plurality of mobile device health data from the mobile device using the vehicle communication system. Determining the health risk probability further may include determining the health risk probability using the machine learning algorithm. The machine learning algorithm is further trained to determine the health risk probability based on the plurality of model input data. The plurality of model input data further includes the plurality of mobile device health data.

In another aspect of the present disclosure, determining the health risk probability further may include capturing a plurality of videos of the occupant using a camera. Determining the health risk probability further may include determining a plurality of occupant induced movements in the plurality of videos of the occupant. Determining the health risk probability further may include determining the health risk probability using the machine learning algorithm. The machine learning algorithm is further trained to determine the health risk probability based on the plurality of model input data. The plurality of model input data further includes the plurality of occupant induced movements.

In another aspect of the present disclosure, determining the health risk probability further may include recording a plurality of touch accuracies of a plurality of occupant interactions with a display. Determining the health risk probability further may include determining the health risk probability using the machine learning algorithm. The machine learning algorithm is further trained to determine the health risk probability based on the plurality of model input data. The plurality of model input data further includes the plurality of touch accuracies of the plurality of occupant interactions with the display.

According to several aspects, a system for detecting a health condition of an occupant of a vehicle is provided. The system includes a plurality of vehicle sensors and controller in electrical communication with the plurality of vehicle sensors. The controller is programmed to perform a plurality of control measurements using the plurality of vehicle sensors The controller is further programmed to perform a plurality of occupant movement measurements using the plurality of vehicle sensors The controller is further programmed to determine a health risk probability based at least in part on the plurality of control measurements, and the plurality of occupant movement measurements. The health risk probability is a probability that the occupant of the vehicle has the health condition The controller is further programmed to notify the occupant of the vehicle in response to determining that the health risk probability is greater than or equal to a predetermined health risk threshold.

In another aspect of the present disclosure, the system further includes an automated driving system in electrical communication with the controller and a vehicle communication system in electrical communication with the controller. The controller is further programmed to generate a plurality of expected control inputs using the automated driving system. The controller is further programmed to retrieve a plurality of mobile device health data from a mobile device using the vehicle communication system. The controller is further programmed to determine a health risk probability based at least in part on the plurality of control measurements, the plurality of occupant movement measurements, the plurality of expected control inputs, and the plurality of mobile device health data. The health risk probability is a probability that the occupant of the vehicle has the health condition.

In another aspect of the present disclosure, the system further includes a display in electrical communication with the controller. The controller is further programmed to record a plurality of touch accuracies of a plurality of occupant interactions with the display. The controller is further programmed to determine a health risk probability based at least in part on the plurality of control measurements, the plurality of occupant movement measurements, the plurality of expected control inputs, the plurality of mobile device health data, and the plurality of touch accuracies. The health risk probability is a probability that the occupant of the vehicle has the health condition.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Occupants may spend long periods of time in a vehicle, performing tasks which require both gross and fine motor skills (e.g., actuating vehicle controls such as accelerator pedal, brake pedal, and steering wheel). Therefore, a vehicle may provide an ideal environment for evaluating movements and behaviors of the occupant for purposes of monitoring for symptoms of health conditions, such as, for example, motor disorders.

Figure 1:
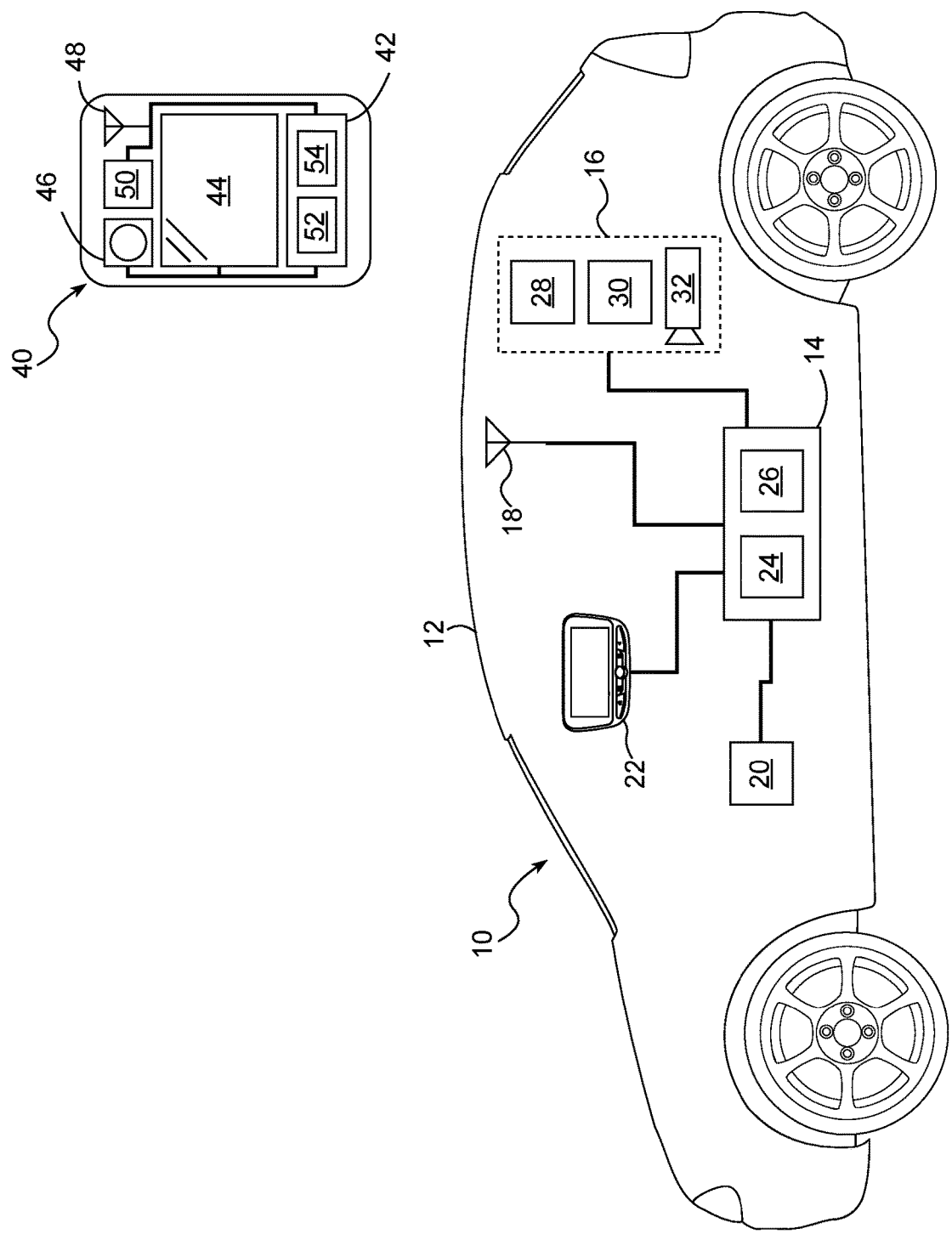
FIG. 1 is a schematic diagram of a system for detecting a health condition of an occupant of a vehicle according to an exemplary embodiment.

Referring to FIG. 1, a system for detecting a health condition of an occupant of a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, vehicle sensors 16, a vehicle communication system 18, an automated driving system 20, and a display 22.

The controller 14 is used to implement a method 100 for detecting a health condition of an occupant of a vehicle, as will be described below. The controller 14 includes at least one processor 24 and a non-transitory computer readable storage device or media 26. The processor 24 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 26 may include volatile and nonvolatile storage in read-only memory (ROM), random-access memory (RAM), and keep-alive memory (KAM), for example. KAM is a persistent or non-volatile memory that may be used to store various operating variables while the processor 24 is powered down. The computer-readable storage device or media 26 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the vehicle sensors 16, the vehicle communication system 18, the automated driving system 20, and the display 22. In an exemplary embodiment, the electrical communication is established using, for example, a CAN bus, a Wi-Fi network, a cellular data network, or the like. It should be understood that various additional wired and wireless techniques and communication protocols for communicating with the controller 14 are within the scope of the present disclosure.

The vehicle sensors 16 are used by the controller 14 to receive information about an environment surrounding the vehicle 12 and control inputs provided to the vehicle 12 by the occupant. In an exemplary embodiment, the vehicle sensors 16 include control sensors 28 and reference sensors 30. The control sensors 28 are sensors which are configured to monitor control inputs provided to the vehicle 12. In a non-limiting example, the control sensors 28 include an accelerator pedal position sensor, a brake pedal position sensor, a steering wheel angle sensor, and a steering wheel torque sensor. It should be understood that additional control sensors 28 may be used without departing from the scope of the present disclosure. In the scope of the present disclosure, a control input is defined as a change in value of one of the control sensors 28. For example, a change in a position of the accelerator pedal, as determined from at least two measurements from the accelerator pedal position sensor, is referred to as a control input.

The reference sensors 30 are sensors which are configured to monitor motion of the vehicle 12. Motion of the vehicle 12 may influence control inputs provided to the vehicle 12. In a non-limiting example, driving over a bump or uneven road surface may cause a change in steering angle without any input from the occupant. Therefore, the reference sensors 30 are used to monitor the motion of the vehicle 12, such that occupant induced control inputs may be distinguished from control inputs induced by vehicle motion, as will be discussed in greater detail below. In a non-limiting example, the reference sensors 30 include vehicle suspension position sensors (e.g., linear displacement sensors, strain sensors, pressure sensors, and/or the like). In another non-limiting example, the reference sensors 30 further include an inertial measurement unit (IMU), an accelerometer, a gyroscope, and/or the like. It should be understood that additional reference sensors 30 may be used without departing from the scope of the present disclosure.

In another exemplary embodiment, the vehicle sensors 16 further include an occupant movement sensor. The occupant movement sensor is used to detect movement of the occupant within the vehicle 12. In a non-limiting example, the occupant movement sensor is a LIDAR sensor positioned within the vehicle 12. In another non-limiting example shown in FIG. 1, the occupant movement sensor is an interior camera 32. In an exemplary embodiment, the interior camera 32 is a photo and/or video camera which is positioned to view the occupant within the vehicle 12. In one example, the interior camera 32 is affixed inside of the vehicle 12, for example, in a headliner of the vehicle 12, having a view of the occupant. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The vehicle sensors 16 are in electrical communication with the controller 14 as discussed above.

The vehicle communication system 18 is used by the controller 14 to communicate with other systems external to the vehicle 12. For example, the vehicle communication system 18 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 18 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 18 may include one or more antennas and/or communication transceivers for receiving and/or transmitting signals, such as cooperative sensing messages (CSMs). The vehicle communication system 18 is configured to wirelessly communicate information between the vehicle 12 and another vehicle. Further, the vehicle communication system 18 is configured to wirelessly communicate information between the vehicle 12 and infrastructure or other vehicles. The vehicle communication system 18 is in electrical communication with the controller 14 as discussed above.

The automated driving system 20 is used to generate expected control inputs based on the environment surrounding the vehicle 12. In an exemplary embodiment, the automated driving system 20 includes a plurality of automated driving sensors configured to receive information about the environment surrounding the vehicle 12. In a non-limiting example, the automated driving system 20 includes ranging sensors (e.g., LiDAR, radar, ultrasonic sensors, and/or the like) and computer vision sensors (e.g., cameras, stereo cameras, and/or the like). In another exemplary embodiment, the automated driving system 20 further includes an automated driving controller in electrical communication with the plurality of automated driving sensors. The automated driving controller receives information from the automated driving sensors and generates control inputs (e.g., accelerator pedal position change, brake pedal position change, steering angle change, etc.) to navigate the environment. The control inputs generated by the automated driving controller are referred to as the expected control inputs. The expected control inputs provide a baseline for comparison against control inputs provided by the occupant. The control inputs provided by the occupant are referred to as the occupant control inputs, as will be discussed in greater detail below. In a non-limiting example, the automated driving controller uses a machine learning algorithm to generate expected control inputs based on the information from the automated driving sensors. The automated driving system 20 is in electrical communication with the controller 14 as discussed above.

The display 22 is used to provide information to the occupant of the vehicle 12. In the scope of the present disclosure, the occupant includes a driver and/or a passenger of the vehicle 12. In the exemplary embodiment depicted in FIG. 1, the display 22 is a human-machine interface (HMI) located in view of the occupant and capable of displaying text, graphics and/or images. It is to be understood that HMI display systems including LCD displays, LED displays, and the like are within the scope of the present disclosure. Further exemplary embodiments where the display 22 is disposed in a rearview mirror are also within the scope of the present disclosure. In another exemplary embodiment, the display 22 includes a head-up display (HUD) configured to provide information to the occupant by projecting text, graphics, and/or images upon the windscreen of the vehicle 12. The text, graphics, and/or images are reflected by the windscreen of the vehicle 12 and are visible to the occupant without looking away from a roadway ahead of the vehicle 12. In another exemplary embodiment, the display 22 includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. In an exemplary embodiment, the occupant may interact with the display 22 using a human-interface device (HID), including, for example, a touchscreen, an electromechanical switch, a capacitive switch, a rotary knob, and the like. It should be understood that additional systems for displaying information to the occupant of the vehicle 12 are also within the scope of the present disclosure. The display 22 is in electrical communication with the controller 14 as discussed above.

With continued reference to FIG. 1, a mobile device 40 is in wireless communication with the system 10. While the mobile device 40 is depicted as a smartphone in FIG. 1, it should be understood that additional mobile devices, such as, for example, tablets, fitness trackers, smart wearable devices, and the like are within the scope of the present disclosure.

The mobile device 40 is used to provide information to the occupant when the occupant is not in the vehicle 12. The mobile device 40 includes a mobile device controller 42, a mobile device display 44, a mobile device camera 46, a mobile device communication system 48, and mobile device sensors 50. Each of the mobile device display 44, the mobile device camera 46, the mobile device communication system 48, and the mobile device sensors 50 are in electrical communication with the mobile device controller 42.

The mobile device controller 42 controls the operation of the mobile device 40. The mobile device controller 42 includes at least one mobile device processor 52 and a mobile device non-transitory computer readable storage device or media 54. In a non-limiting example, the mobile device processor 52 and mobile device media 54 of the mobile device controller 42 are similar in structure and/or function to the processor 24 and the media 26 of the controller 14, as described above.

The mobile device display 44 is used to display information to the occupant. The mobile device display 44 is capable of displaying text, graphics, and/or images. It should be understood that the mobile device display 44 may include an LCD display, LED display, and/or the like without departing from the scope of the present disclosure.

The mobile device camera 46 is used to capture images of an environment surrounding the mobile device 40. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The mobile device communication system 48 allows the mobile device controller 42 to communicate with remote systems. In an exemplary embodiment, the mobile device communication system 48 includes a wireless communication system configured to communicate using wireless networks such as a wireless local area network (WLAN) using IEEE 802.11 standards and/or using cellular data communication. Accordingly, in a non-limiting example, the mobile device communication system 48 includes one or more antennas and/or communication transceivers for transmitting and/or receiving signals.

The mobile device sensors 50 are used to monitor the environment surrounding the mobile device 40. In an exemplary embodiment, the mobile device sensors 50 include motion sensors, such as, for example, an accelerometer, a gyroscope, a magnetometer, and the like. In another exemplary embodiment, the mobile device sensors 50 further include user health sensors, such as, for example, a heart rate sensor, a blood oxygen sensor, a body temperature sensor, and the like. In a non-limiting example, the mobile device sensors 50 are used by the mobile device controller 42 to gather health data about a user of the mobile device 40, referred to as mobile device health data.

Figure 2:
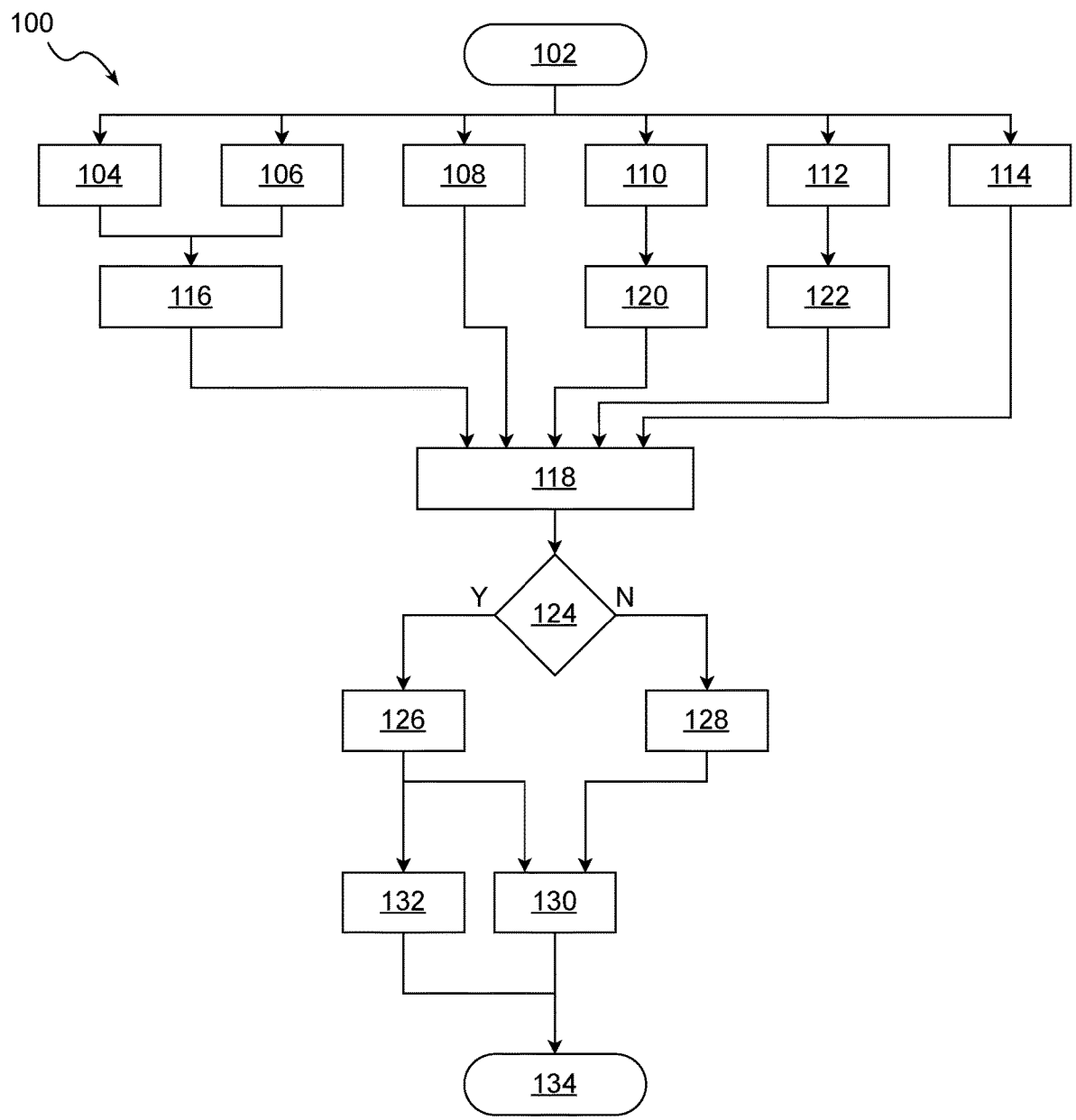
FIG. 2 is a flowchart of a method for detecting a health condition of an occupant of a vehicle according to an exemplary embodiment.

Referring to FIG. 2, a flowchart of the method 100 for detecting a health condition of an occupant of a vehicle is shown. The method 100 begins at block 102 and proceeds to blocks 104, 106, 108, 110, 112, and 114. At block 104, the controller 14 uses the control sensors 28 to perform a plurality of control measurements. In a non-limiting example, the plurality of control measurements includes a plurality of accelerator pedal position measurements, brake pedal position measurements, steering wheel angle measurements, and steering wheel torque measurements. In an exemplary embodiment, each of the plurality of control measurements is performed periodically, for example, every two hundred milliseconds. After block 104, the method 100 proceeds to block 116.

At block 106, the controller 14 performs a plurality of vehicle movement measurements using the reference sensors 30. In a non-limiting example, the plurality of vehicle movement measurements includes a plurality of vehicle suspension position measurements, acceleration measurements, orientation measurements, and angular velocity measurements. In an exemplary embodiment, each of the plurality of vehicle movement measurements is performed periodically, for example, every two hundred milliseconds. After block 106, the method 100 proceeds to block 116.

At block 116, the controller 14 determines a plurality of occupant control inputs based on the plurality of control measurements performed at block 104 and the plurality of vehicle movement measurements performed at block 106. In the scope of the present disclosure, the plurality of occupant control inputs are defined as control inputs which are directly caused by the occupant, and not by motion of the vehicle 12.

In an exemplary embodiment, the plurality of occupant control inputs are defined as a plurality of control inputs minus a plurality of non-occupant control inputs. The plurality of control inputs are determined based on the plurality of control measurements performed at block 104. As discussed above, a control input is defined as a change in value of one of the control sensors 28. Therefore, each of the plurality of control inputs is determined based on at least two of the plurality of control measurements. For example, an accelerator pedal control input is defined as a change in accelerator pedal position, as determined by at least two accelerator pedal position measurements performed at block 104.

In the scope of the present disclosure, the plurality of non-occupant control inputs are defined as control inputs which are caused by motion of the vehicle 12, and not intended by the occupant. In a non-limiting example, driving over a bump or uneven road surface may cause a change in steering angle without any intended input from the occupant. In another non-limiting example, driving over a bump or uneven road surface may cause the occupant to involuntarily actuate the accelerator and/or brake pedal due to unexpected motion of the vehicle 12. The plurality of non-occupant control inputs are determined based on the plurality of vehicle movement measurements performed at block 106. For example, if the vehicle 12 drives over an uneven road surface, steering angle control inputs may be influenced by the road conditions. Therefore, steering angle control inputs caused by motion of the vehicle 12 (as measured at block 106) are determined to be non-occupant control inputs and are subtracted from the control inputs (as measured at block 104) to determine the occupant control inputs. After block 116, the method 100 proceeds to block 118, as will be discussed in further detail below.

At block 108, the controller 14 uses the automated driving system 20 to generate a plurality of expected control inputs. In a non-limiting example, the automated driving controller uses a machine learning algorithm to generate expected control inputs based on the information from the automated driving sensors, as discussed above. After block 108, the method 100 proceeds to block 118, as will be discussed in further detail below.

At block 110, the controller 14 establishes a connection with the mobile device 40 using the vehicle communication system 18. In an exemplary embodiment, the connection is established between the vehicle communication system 18 and the mobile device communication system 48 using a wireless protocol, such as, for example, WLAN (IEEE 802.11) and/or BLUETOOTH. After block 110, the method 100 proceeds to block 120.

At block 120, the controller 14 retrieves a plurality of mobile device health data from the mobile device 40 using the vehicle communication system 18. In an exemplary embodiment, the plurality of mobile device health data has been captured by the mobile device 40 using the mobile device sensors 50. In a non-limiting example, the plurality of mobile device health data includes at least one of: motion data, activity data, heart rate data, blood oxygen data, and the like. After block 120, the method 100 proceeds to block 118, as will be discussed in further detail below.

At block 112, the controller 14 uses the interior camera 32 to capture a plurality of videos of the occupant. After block 112, the method 100 proceeds to block 122. At block 122, the controller 14 determines a plurality of occupant induced movements in the plurality of videos of the occupant captured at block 112. In an exemplary embodiment, background subtraction is used to subtract a static background of each frame of each of the plurality of videos from a subsequent frame of each of the plurality of videos, leaving only the moving objects in each of the plurality of videos. In another exemplary embodiment, optic flow is used to measure movement of pixels between consecutive video frames. It should be understood that various additional techniques for isolating movement from video are within the scope of the present disclosure. In another exemplary embodiment, movements determined at block 112 are compared with movement of the vehicle 12 as determined by the reference sensors 30 to isolate occupant movement caused by movement of the vehicle from occupant induced movement. After block 122, the method 100 proceeds to block 118, as will be discussed in further detail below.

At block 114, the controller 14 uses the display 22 to record a plurality of touch accuracies of a plurality of occupant interactions with the display 22. In an exemplary embodiment where the display 22 is a touchscreen, the touchscreen of the display 22 is divided into a two-dimensional coordinate grid of pixels. Therefore, a particular interface element for occupant interaction, such as an on-screen button, is defined by a two-dimensional pixel area. In a non-limiting example, the touch accuracy of a particular touch event is inversely proportional to a distance, in pixels, between a center of the two-dimensional pixel area defining the nearest interface element and the location touched by the occupant. For example, if an on-screen button is centered at pixel (1,1) on the display 22, and the occupant touches pixel (1,5), the touch accuracy is inversely proportional to the distance between the center of the on-screen button and the touch location of the occupant (i.e., four pixels). By recording a plurality of touch accuracies across a plurality of touch accuracy events at block 114, average touch accuracy and trends in touch accuracy may be identified. After block 114, the method 100 proceeds to block 118, as will be discussed in further detail below.

At block 118, the controller 14 determines a plurality of health risk probabilities based on a plurality of model input data. In the scope of the present disclosure, the plurality of model input data includes the plurality of expected control inputs (determined at block 108), the plurality of touch accuracies (determined at block 114), the plurality of occupant control inputs (determined at block 116), the plurality of mobile device health data (determined at block 120), and the plurality of occupant induced movements (determined at block 122). In the scope of the present disclosure, the health risk probability is a certainty of the system 10 that the occupant is at risk for and/or suffering from a particular health condition based on the plurality of model input data. Therefore, the plurality of health risk probabilities may include, for example, a probability that the occupant has Parkinson's disease, a probability that the occupant has Lou Gehrig's disease, a probability that the occupant has Huntington's disease, and a probability that the occupant has no health condition. It should be understood that the plurality of health risk probabilities may include probabilities for various additional health conditions.

In an exemplary embodiment, the plurality of health risk probabilities is determined using a machine learning algorithm which has been trained using supervised learning. In a non-limiting example, to train the machine learning algorithm, the algorithm is provided with a large volume of pre-labeled training data (e.g., occupant control input data, occupant induced movement data, mobile device health data, touch accuracy data, etc.) for occupants with particular health conditions and occupants with no health conditions. Once the algorithm has been trained with a large volume of pre-labeled training data, the algorithm can provide a plurality of health risk probabilities with a high degree of accuracy. In another exemplary embodiment, the machine learning algorithm utilizes continued learning to continuously train using new model input data, as will be discussed in further detail below.

In another exemplary embodiment, the plurality of model input data is transferred to a remote system (e.g., a remote server) using the vehicle communication system 18, and the machine learning algorithm is executed by the remote system. The plurality of health risk probabilities are then transmitted back to the controller 14 by the remote system and received using the vehicle communication system 18. After block 118, the method 100 proceeds to block 124.

At block 124, if any of the plurality of health risk probabilities is greater than or equal to a predetermined health risk threshold (e.g., 75%), the method 100 proceeds to block 126. If none of the plurality of health risk probabilities is greater than or equal to the predetermined health risk threshold, the method 100 proceeds to block 128.

At block 126, the model input data used at block 118 to determine the plurality of health risk probabilities is labeled as positive diagnosis model input data for each of the plurality of health conditions for which the health risk probability is greater than or equal to the health risk threshold. For example, if probability that the occupant has Parkinson's disease is 78%, the probability that the occupant has Lou Gehrig's disease is 75%, the probability that the occupant has Huntington's disease is 40%, and the probability that the occupant has no health condition is 20%, the model input data is labeled as positive diagnosis for Parkinson's disease and Lou Gehrig's disease. After block 126, the method 100 proceeds to blocks 130 and 132.

At block 130, the machine learning algorithm used at block 118 is further trained using the labeled model input data labeled at block 126. After block 130, the method 100 proceeds to enter a standby state at block 134.

At block 132, the occupant of the vehicle 12 is notified of the health risk probability using the display 22. In an exemplary embodiment, the display 22 shows a warning to the occupant, advising the occupant to seek advice of a medical professional. In another exemplary embodiment, the display 22 provides an option for the occupant to transmit the model input data to the mobile device 40 using the vehicle communication system 18 for further review. After block 132, the method 100 proceeds to enter the standby state at block 134.

At block 128, the model input data used at block 118 to determine the plurality of health risk probabilities is labeled as negative diagnosis model input data for each of the plurality of health conditions for which the health risk probability is less than the health risk threshold. For example, if probability that the occupant has Parkinson's disease is 30%, the probability that the occupant has Lou Gehrig's disease is 26%, the probability that the occupant has Huntington's disease is 32%, and the probability that the occupant has no health condition is 60%, the model input data is labeled as negative diagnosis for Parkinson's disease, Lou Gehrig's disease, and Huntington's disease. After block 128, the method 100 proceeds to block 130.

In an exemplary embodiment, the controller 14 repeatedly exits the standby state 134 and restarts the method 100 at block 102. In a non-limiting example, the controller 14 exits the standby state 134 and restarts the method 100 on a timer, for example, every three hundred milliseconds.

The system 10 and method 100 of the present disclosure offer several advantages. By evaluating the movement and behavior of the occupant over a long period of time with repeated measurement, for example, by repeatedly performing the method 100 over a long period of time (e.g., multiple years), trends and progressions of health conditions may be identified. Use of the system 10 and method 100 may lead to earlier diagnosis of health conditions and improved health outcomes.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for detecting a health condition of an occupant of a vehicle, the system comprising:
    a plurality of vehicle sensors including at least one control sensor and at least one reference sensor, wherein the at least one control sensor is configured to measure a control input provided to the vehicle by the occupant, and wherein the at least one reference sensor is configured to measure a movement of the vehicle; and
    a controller in electrical communication with the plurality of vehicle sensors, wherein the controller is programmed to:
        perform a plurality of measurements using the plurality of vehicle sensors, wherein the plurality of measurements includes a plurality of control measurements performed using the at least one control sensor and a plurality of vehicle movement measurements performed using the at least one reference sensor;
        determine a plurality of occupant control inputs based at least in part on the plurality of control measurements and the plurality of vehicle movement measurements;
        determine a health risk probability based at least in part on the plurality of occupant control inputs, wherein the health risk probability is a probability that the occupant of the vehicle has the health condition; and
        notify the occupant of the vehicle in response to determining that the health risk probability is greater than or equal to a predetermined health risk threshold.

2. The system of claim 1, wherein to determine the health risk probability, the controller is further programmed to:
    determine the health risk probability using a machine learning algorithm, wherein the machine learning algorithm is trained to determine the health risk probability based on a plurality of model input data, and wherein the plurality of model input data includes at least the plurality of occupant control inputs.

3. The system of claim 2, further including an automated driving system in electrical communication with the controller, wherein to determine the health risk probability, the controller is further programmed to:
    generate a plurality of expected control inputs using the automated driving system; and
    determine the health risk probability using the machine learning algorithm, wherein the machine learning algorithm is trained to determine the health risk probability based on the plurality of model input data, and wherein the plurality of model input data further includes the plurality of expected control inputs.

4. The system of claim 2, further including a vehicle communication system in electrical communication with the controller, wherein to determine the health risk probability, the controller is further programmed to:
    establish a connection with a mobile device using the vehicle communication system;
    retrieve a plurality of mobile device health data from the mobile device using the vehicle communication system; and
    determine the health risk probability using the machine learning algorithm, wherein the machine learning algorithm is further trained to determine the health risk probability based on the plurality of model input data, and wherein the plurality of model input data further includes the plurality of mobile device health data.

5. The system of claim 4, wherein the controller is further programmed to:
    establish a connection with a remote server using the vehicle communication system;
    transfer the plurality of model input data to the remote server using the vehicle communication system, wherein the machine learning algorithm is executed by the remote server using the plurality of model input data; and
    receive the health risk probability from the remote server using the vehicle communication system.

6. The system of claim 2, wherein the plurality of vehicle sensors includes an occupant movement sensor, and wherein to determine the health risk probability, the controller is further programmed to:
    perform a plurality of occupant movement measurements using the occupant movement sensor; and
    determine the health risk probability using the machine learning algorithm, wherein the machine learning algorithm is further trained to determine the health risk probability based on the plurality of model input data, and wherein the plurality of model input data further includes the plurality of occupant movement measurements.

7. The system of claim 6, wherein the occupant movement sensor is a camera, and wherein to perform the plurality of occupant movement measurements, the controller is further programmed to:
    capture a plurality of videos of the occupant using the camera;
    determine a plurality of occupant induced movements in the plurality of videos of the occupant; and
    determine the health risk probability using the machine learning algorithm, wherein the machine learning algorithm is further trained to determine the health risk probability based on the plurality of model input data, and wherein the plurality of model input data further includes the plurality of occupant induced movements.

8. The system of claim 2, further including a display in electrical communication with the controller, wherein to determine the health risk probability, the controller is further programmed to:
    record a plurality of touch accuracies of a plurality of occupant interactions with the display; and
    determine the health risk probability using the machine learning algorithm, wherein the machine learning algorithm is further trained to determine the health risk probability based on the plurality of model input data, and wherein the plurality of model input data further includes the plurality of touch accuracies of the plurality of occupant interactions with the display.

9. The system of claim 2, wherein the controller is further programmed to:
    label the model input data as positive diagnosis model input data in response to determining that the health risk probability is greater than or equal to the predetermined health risk threshold;
    train the machine learning algorithm using the positive diagnosis model input data in response to labeling the model input data as positive diagnosis model input data;
    label the model input data as negative diagnosis model input data in response to determining that the health risk probability is less than the predetermined health risk threshold; and
    train the machine learning algorithm using the negative diagnosis model input data in response to labeling the model input data as negative diagnosis model input data.

10. A method for detecting a health condition of an occupant of a vehicle, the method comprising:
    performing a plurality of measurements using a plurality of vehicle sensors, wherein the plurality of measurements includes a plurality of control measurements and a plurality of vehicle movement measurements;
    determining a plurality of occupant control inputs based at least in part on the plurality of control measurements and the plurality of vehicle movement measurements;
    determining a health risk probability based at least in part on the plurality of occupant control inputs, wherein the health risk probability is a probability that the occupant of the vehicle has the health condition; and
    notifying the occupant of the vehicle in response to determining that the health risk probability is greater than or equal to a predetermined health risk threshold.

11. The method of claim 10, wherein determining the health risk probability further comprises:
    determining the health risk probability using a machine learning algorithm, wherein the machine learning algorithm is trained to determine the health risk probability based on a plurality of model input data, and wherein the plurality of model input data includes at least the plurality of occupant control inputs.

12. The method of claim 11, wherein determining the health risk probability further comprises:
    generating a plurality of expected control inputs using an automated driving system; and
    determining the health risk probability using the machine learning algorithm, wherein the machine learning algorithm is trained to determine the health risk probability based on the plurality of model input data, and wherein the plurality of model input data further includes the plurality of expected control inputs.

13. The method of claim 12, wherein determining the health risk probability further comprises:
    establishing a connection with a mobile device using a vehicle communication system;
    retrieving a plurality of mobile device health data from the mobile device using the vehicle communication system; and
    determining the health risk probability using the machine learning algorithm, wherein the machine learning algorithm is further trained to determine the health risk probability based on the plurality of model input data, and wherein the plurality of model input data further includes the plurality of mobile device health data.

14. The method of claim 13, wherein determining the health risk probability further comprises:
    capturing a plurality of videos of the occupant using a camera;
    determining a plurality of occupant induced movements in the plurality of videos of the occupant; and
    determining the health risk probability using the machine learning algorithm, wherein the machine learning algorithm is further trained to determine the health risk probability based on the plurality of model input data, and wherein the plurality of model input data further includes the plurality of occupant induced movements.

15. The method of claim 14, wherein determining the health risk probability further comprises:
    recording a plurality of touch accuracies of a plurality of occupant interactions with a display; and
    determining the health risk probability using the machine learning algorithm, wherein the machine learning algorithm is further trained to determine the health risk probability based on the plurality of model input data, and wherein the plurality of model input data further includes the plurality of touch accuracies of the plurality of occupant interactions with the display.

16. A system for detecting a health condition of an occupant of a vehicle, the system comprising:
    a plurality of vehicle sensors;
    an automated driving system;
    a vehicle communication system; and
    a controller in electrical communication with the plurality of vehicle sensors, wherein the controller is programmed to:
        perform a plurality of control measurements using the plurality of vehicle sensors;
        perform a plurality of occupant movement measurements using the plurality of vehicle sensors;
        generate a plurality of expected control inputs using the automated driving system;
        retrieve a plurality of mobile device health data from a mobile device using the vehicle communication system;
        determine a health risk probability based at least in part on the plurality of control measurements, the plurality of occupant movement measurements, the plurality of expected control inputs, and the plurality of mobile device health data, wherein the health risk probability is a probability that the occupant of the vehicle has the health condition; and
        notify the occupant of the vehicle in response to determining that the health risk probability is greater than or equal to a predetermined health risk threshold.

17. The system of claim 16, further comprising:
    a display in electrical communication with the controller; and
        wherein the controller is further programmed to:
            record a plurality of touch accuracies of a plurality of occupant interactions with the display; and
            determine a health risk probability based at least in part on the plurality of control measurements, the plurality of occupant movement measurements, the plurality of expected control inputs, the plurality of mobile device health data, and the plurality of touch accuracies, wherein the health risk probability is a probability that the occupant of the vehicle has the health condition.

\* \* \* \* \*